US007834492B2

(12) United States Patent
Iund et al.

(10) Patent No.: US 7,834,492 B2
(45) Date of Patent: Nov. 16, 2010

(54) ELECTRIC MACHINE HAVING A LIQUID-COOLED ROTOR

(75) Inventors: Trevor N. Iund, Peoria, IL (US); Roy Wookey, Canton, IL (US); Jonathan Matthew Baumann, Peoria, IL (US); Matthew Dames, Brimfield, IL (US)

(73) Assignee: Caterpillar Inc, Peoria, IL (US)

( * ) Notice: Subject to any disclaimer, the term of this patent is extended or adjusted under 35 U.S.C. 154(b) by 941 days.

(21) Appl. No.: 11/495,766

(22) Filed: Jul. 31, 2006

(65) Prior Publication Data

US 2008/0024020 A1 Jan. 31, 2008

(51) Int. Cl.
*H02K 9/00* (2006.01)
*H02K 9/06* (2006.01)

(52) U.S. Cl. .............................. 310/52; 310/58; 310/59; 310/61; 310/64

(58) Field of Classification Search .................. 310/52, 310/58, 59, 64, 101, 112, 60 A, 61, 90
See application file for complete search history.

(56) References Cited

U.S. PATENT DOCUMENTS 3,075,104 A 1/1963 Willyoung et al.
3,149,478 A * 9/1964 Anderson et al. ............. 62/469
3,497,736 A * 2/1970 Kranz et al. .................. 310/54
3,629,628 A 12/1971 Rank et al.
3,727,085 A 4/1973 Goetz et al.
3,805,101 A 4/1974 Purman
4,138,862 A 2/1979 Müller
4,182,137 A 1/1980 Erth
4,262,224 A 4/1981 Kofink et al.
4,310,143 A * 1/1982 Determan ................ 251/30.02
4,429,924 A * 2/1984 Franz et al. ................. 384/462
4,527,745 A * 7/1985 Butterfield et al. .......... 239/600
5,019,733 A 5/1991 Kano et al.
5,821,653 A * 10/1998 Kinto et al. ................... 310/89
6,234,414 B1 * 5/2001 DeVitis et al. ................ 241/30
6,772,504 B2 * 8/2004 Weidman et al. .............. 29/598
6,833,641 B2 * 12/2004 Uchida et al. ................. 310/54
7,009,317 B2 3/2006 Cronin et al.
2003/0030333 A1 * 2/2003 Johnsen ....................... 310/54
2005/0151431 A1 * 7/2005 Cronin et al. ............ 310/60 A (Continued)

FOREIGN PATENT DOCUMENTS

EP 0921623 6/1999

(Continued)

OTHER PUBLICATIONS

Machine Translation JP11166497 (1999).*

*Primary Examiner*—Quyen Leung
*Assistant Examiner*—Jose A Gonzalez Quinones
(74) *Attorney, Agent, or Firm*—Finnegan, Henderson, Farabow, Garrett & Dunner LLC

(57) ABSTRACT

An electric machine for a power system is disclosed. The electric machine has a housing with a first end cap and a second end cap. The first end cap has a first fluid passageway, and the second end cap has a second fluid passageway. The electric machine also has a stator fixedly disposed within the housing, and a rotor rotationally disposed radially inward from the stator. The rotor has an axial passageway fluidly communicating the first fluid passageway with the second fluid passageway.

18 Claims, 2 Drawing Sheets

U.S. PATENT DOCUMENTS

2007/0120427 A1 * 5/2007 Iund et al. .................... 310/54

FOREIGN PATENT DOCUMENTS

JP 04229049 8/1992
JP 806596- 3/1996
JP 11166497 A * 6/1999
JP 2001008413 1/2001
JP 2001218425 8/2001

* cited by examiner

ELECTRIC MACHINE HAVING A LIQUID-COOLED ROTOR

TECHNICAL FIELD

The present disclosure relates generally to an electric machine and, more particularly, to an electric machine having a liquid-cooled rotor.

BACKGROUND

Electric machines such as, for example, motors and generators may be used to generate mechanical power in response to an electrical input or to generate electrical power in response to a mechanical input. Magnetic, resistive, and mechanical losses within the motors and generators during mechanical and electrical power generation cause a build up of heat, which may be dissipated to avoid malfunction and/or failure of the electric machine. One of the limitations on the power output of the electric machines may be the capacity of the electric machine to dissipate this heat.

One method of dissipating heat within a generator includes directing a cooling medium into the generator via a rotor. For example, U.S. Pat. No. 5,019,733 (the '733 patent) to Kano et al. teaches an excitation-type AC generator having stator and field coils cooled by a fluid passing through the rotating shaft of a rotor. Specifically, during circulation, the fluid is directed axially into one end of the rotor shaft and then immediately outward via radially-bored passageways to spray the fluid onto the stator and field coils, thereby removing heat from the generator.

Although the radially-bored passageways of the rotor shaft may facilitate some heat removal from portions of the excitation-type AC generator, they may remove too little heat, and the removal of heat may be disproportionate. In particular, because the cooling fluid of the '733 patent is directed away from the rotor immediately after entering the rotor, it may be ineffective for removing substantial amounts of heat from the rotor. In addition, because the fluid enters the rotor shaft from only one end and then is immediately redirected away from the rotor, little or no heat may be removed from the other end of the rotor. This insufficient and disproportionate heat removal could be damaging to components of the generator.

The disclosed electric machine is directed to overcoming one or more of the problems set forth above.

SUMMARY OF THE INVENTION

In one aspect, the present disclosure is directed to an electric machine that includes a housing with a first end cap and a second end cap. The first end cap has a first fluid passageway, and the second end cap has a second fluid passageway. The electric machine also includes a stator fixedly disposed within the housing, and a rotor rotationally disposed radially inward from the stator. The rotor has an axial passageway fluidly communicating the first fluid passageway with the second fluid passageway.

In another aspect, the present disclosure is directed to an electric machine that includes a housing having a first bearing, and a second bearing axially spaced apart from the first bearing. The electric machine also includes a stator fixedly disposed within the housing, and a rotor rotationally supported by the first and second bearings radially inward from the stator. The rotor has an axial passageway fluidly communicating the first and second bearings.

In yet another aspect, the present disclosure is directed to a method of operating an electric machine. The method includes rotating a rotor disposed radially inward of a stator to generate an electrical output. The method also includes directing fluid into the electric machine through a housing external to the stator, directing fluid from the housing axially from one end of the rotor through to the other end of the rotor, and directing fluid from the rotor radially outward to windings of the stator at both ends of the rotor.

DETAILED DESCRIPTION

Figure 1:
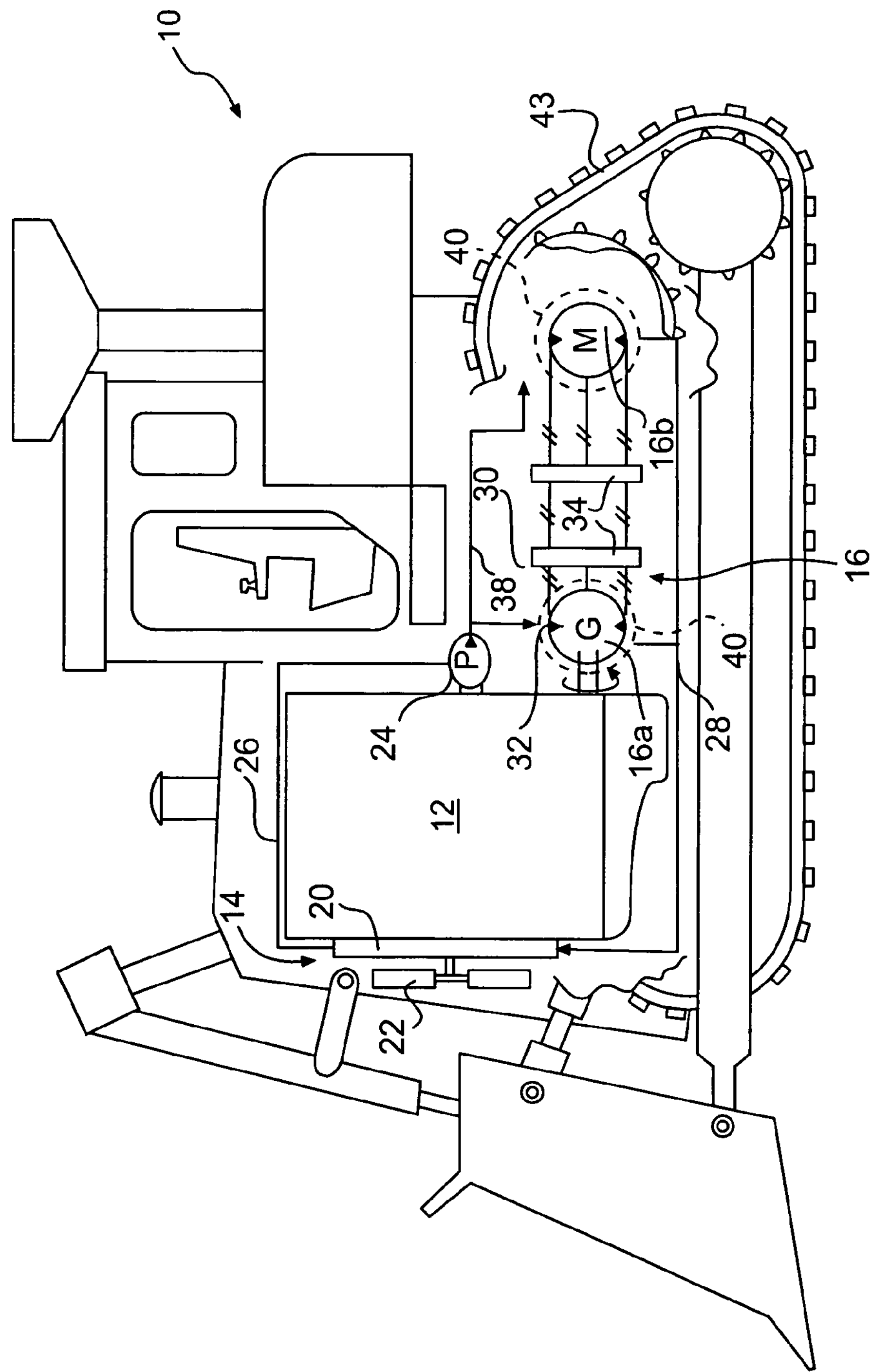
FIG. 1 is a diagrammatic illustration of an exemplary disclosed power system.

FIG. 1 illustrates an exemplary power system 10 having a power source 12, a cooling circuit 14, and an electric machine 16. Power system 10 may form a portion of a mobile vehicle such as, for example, a dozer, an articulated truck, an excavator, or any other mobile vehicle known in the art, with electric machine 16 functioning as the main propulsion unit. It is also contemplated that power system 10 may form a portion of a stationary machine such as a generator set, a pump, or any other suitable stationary machine.

Power source 12 may include a combustion engine operable to produce a rotational mechanical output. For example, power source 12 may include a diesel engine, a gasoline engine, a gaseous fuel-powered engine, or any other type of engine apparent to one skilled in the art. It is also contemplated that power source 12 may alternatively embody a non-combustion source of power such as a fuel cell, a battery, or any other source of power known in the art.

Cooling circuit 14 may embody a pressurized system configured to transfer heat to and/or from power source 12 and/or electric machine 16. Cooling circuit 14 may include a heat exchanger 20, a fan 22, and a source 24 to pressurize, condition, and circulate a heat-transferring medium.

Heat exchanger 20 may embody a liquid-to-air heat exchanger to facilitate the transfer of heat to or from the heat transferring medium. For example, heat exchanger 20 may include a tube and fin-type heat exchanger, a tube and shell-type heat exchanger, a plate-type heat exchanger, or any other type of heat exchanger known in the art. Heat exchanger 20 may be connected to source 24 via a supply conduit 26, and to electric machine 16 via a return conduit 28. It is contemplated that heat exchanger 20 may function as the main radiator of power source 12, the engine oil cooler, the transmission oil cooler, the brake oil cooler, or any other cooling component of power source 12. It is further contemplated that heat exchanger 20 may alternatively be dedicated to conditioning only the heat-transferring medium supplied to electric machine 16.

Fan 22 may be disposed proximal to heat exchanger 20 to produce a flow of air across heat exchanger 20 for liquid-to-air heat transfer. It is contemplated that fan 22 may be omitted, if desired, and a secondary fluid circuit (not shown) connected to heat exchanger 20 to transfer heat to or from the heat transferring medium for liquid-to-liquid heat transfer.

Source 24 may embody any device for pressurizing the heat-transferring medium within cooling circuit 14. For example, source 24 may be a fixed displacement pump, a variable displacement pump, a variable flow pump, or any other type of pump known in the art. Source 24 may be disposed between heat exchanger 20 and electric machine 16, and driven hydraulically, mechanically, or electrically by power source 12. It is contemplated that source 24 may alternatively be located remotely from power source 12 and driven by a means other than power source 12. It is also contemplated that source 24 may be dedicated to pressurizing only the heat-transferring medium directed to electric machine 16.

The heat-transferring medium may be a low or a high-pressure fluid. Low-pressures fluids may include, for example, water, glycol, a water-glycol mixture, a blended air mixture, a power source oil such as transmission oil, engine oil, brake oil, diesel fuel, or any other low-pressure fluid known in the art for transferring heat. High-pressure fluids may include, for example, R-134, propane, nitrogen, helium, or any other high-pressure fluid known in the art.

Electric machine 16 may be drivably connected to power source 12 via a flywheel (not shown), a spring coupling (not shown), a planetary gear arrangement (not shown), and/or in any other manner known in the art. Electric machine 16 may be connected to power source 12 such that a mechanical output rotation of power source 12 results in a corresponding rotation of a traction device 43. It is also contemplated that a rotation of traction device 43 may result in a corresponding mechanical rotation of power source 12 to facilitate reverse power flow operations such as, for example, braking, energy recovery, and other such operations known in the art.

Electric machine 16 may be fluidly connected to receive and discharge the pressurized heat-transferring medium. Specifically, electric machine 16 may have a housing 40 configured to receive pressurized heat-transferring medium from source 24 via a supply conduit 38. After transferring heat with electric machine 16, the heat-transferring medium may be discharged from housing 40 via return conduit 28 for conditioning by heat exchanger 20.

Electric machine 16 may consist of a driving element and a driven element electrically coupled to form a continuously variable transmission. In one exemplary embodiment, the driving element may be an electric generator 16*a*, and the driven element may be an electric motor 16*b*. In this exemplary arrangement, each of electric generator 16*a* and motor 16*b* may have dedicated housings or, alternatively, a single integral housing, if desired.

Figure 2:
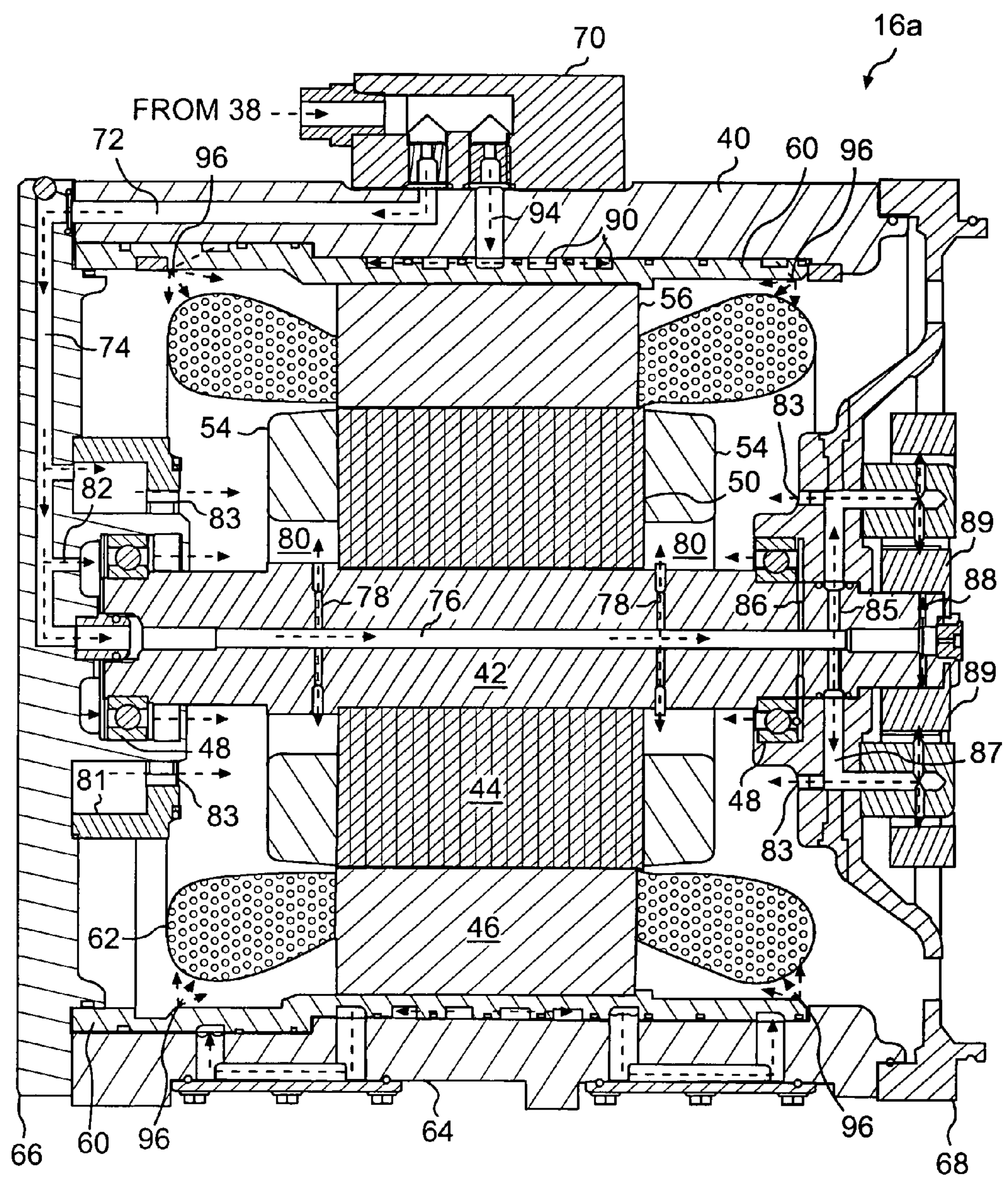
FIG. 2 is a cross-sectional illustration of an electric machine for use with the power system of FIG. 1.

FIG. 2 illustrates electric generator 16*a* having multiple components that interact to produce electrical power in response to a mechanical input. In particular, electric generator 16*a* may include a shaft 42, a rotor 44, and a stator 46. It is contemplated that electric generator 16*a* may contain additional or different components such as, for example, a control system, a processor, power electronics, one or more sensors, a power storage device, and/or other components known in the art. It is also contemplated that rather than producing an electrical output in response to a mechanical input, electric generator 16*a* may alternatively produce mechanical power in response to an electrical input, when electric machine 16 is driven in reverse direction by traction device 43.

Shaft 42 may be a generally cylindrical coupling member for transferring power into and/or out of electric generator 16*a* and may be rotatably connected to housing 40 via one or more bearings 48. Shaft 42 may extend from one end of housing 40 to an opposing end of housing 40. It is also contemplated that shaft 42 may protrude from one end, both ends, or no end of housing 40 and/or that multiple shafts may be included within electric generator 16*a*.

Rotor 44 may be fixedly connected to shaft 42 to interact with a magnetic field within electric generator 16*a* in response to a rotation of shaft 42. Specifically, rotor 44 may include a stack of steel laminations 50 having multiple protruding portions also known as rotor teeth. The rotor teeth may be interconnected by way of one or more aluminum end rings 54. Laminations 50 may be fastened to shaft 42 by, for example, interference fit, welding, threaded fastening, chemical bonding, or in any other appropriate manner. As each protruding portion is rotated to interact with the magnetic field, a current may be produced that is directed to electric motor 16*b*, a power storage device (not shown), or other accessory component (not shown).

Stator 46 may be fixed to housing 40 to produce the magnetic field that interacts with the protruding portions of steel laminations 50. Stator 46 may include laminations of steel 56 having protruding portions also known as stator teeth that extend inward from a ring. Stator 46 may also include an iron sleeve 60 surrounding the ring of laminations 56, and windings 62 of copper wire inserted around and epoxied to each protruding portion to form a plurality of poles. As rotor 44 is rotated to interact with the magnetic field, electrical current may be sequentially generated from windings 62 through the plurality of poles.

Housing 40 may accommodate shaft 42, rotor 44, stator 46, and bearings 48. Housing 40 may include a shell 64, a first end cap 66, and a second end cap 68. Shell 64 may annularly enclose shaft 42, rotor 44, and stator 46, and connect to first and second end caps 66, 68. First and second end caps 66, 68 may house bearings 48 and, thereby, support the rotation of shaft 42 and rotor 44. Second end cap 68 may include a centrally located through-hole that allows the extension of shaft 42 through housing 40. It is contemplated that one of first and second end caps 66, 68 may alternatively be integrally formed with shell 64, if desired.

As also illustrated in FIG. 2, electric generator 16*a* may include an internal cooling circuit to direct the heat-transferring medium throughout or near the heat-generating components of electric generator 16*a*. In particular, the heat-transferring medium may enter electric housing 40 via a distribution block 70, proceed via an axial passageway 72 in shell 64 to first end cap 66, and then flow inward to shaft 42 via a radial passageway 74. An axial through bore 76 within shaft 42 may direct the heat-transferring medium from one end of shaft 42 to the opposite end of shaft 42 to remove heat from rotor 44 along its entire length. Two sets of radial passageways 78 located within each opposing end of shaft 42 may allow the heat-transferring medium to flow outward from axial through bore 76 to an interior annular groove 80 formed within each of end rings 54. Interior annular grooves 80 may help to retain the heat-transferring medium against rotor 44 for maximum heat transfer with rotor 44. As interior annular grooves 80 fill with the heat-transferring medium, the heat-transferring medium may spill out of interior annular grooves 80 and be flung outward into contact with windings 62 of stator 46. After transferring heat with stator 46, the heat-transferring medium may collect with a sump (not shown) for removal from electric generator 16*a* by way of a termination box (not shown).

The heat-transferring medium may also be directed axially to end rings 54. Specifically, a distribution ring 81 may be connected to first end cap 66. Distribution ring 81 may include multiple nozzles or orifices 83 through which the heat-transferring medium from radial passageway 74 may be sprayed axially onto the closer of end rings 54 without ever flowing through shaft 42. In similar fashion, heat-transferring medium from axial through bore 76 may flow through a third set of radial passageways 85 to a distribution ring 87 that is integral with second end cap 68. From distribution ring 87, the heat transferring medium may flow axially through orifices 83 toward the remaining end ring 54. It is contemplated that distribution ring 81 may alternatively be integral with first end cap 66 and/or that distribution ring 87 may alternatively be separate from second end cap 68, if desired.

In addition to transferring heat with electric generator 16*a*, the heat-transferring medium may also lubricate portions of electric generator 16*a*. In particular, a fourth set of radial passageways 86 within shaft 42 may direct the heat-transferring medium from axial through bore 76 to the bearing 48 located with second end cap 68. Heat-transferring medium may also be directed from radial passageway 74 axially to the bearing 48 located within first end cap 66 via passageway 82. After lubricating bearings 48, the heat-transferring medium may combine with the fluid exiting interior annular grooves 80 to transfer heat with windings 62 of stator 46. Further, a fifth set of radial passageways 88 within shaft 42 may direct heat-transferring medium from axial through bore 76 to lubricate the engagement of shaft 42 with one or more radially-offset spur gears 89, which may be operatively driven by shaft 42. Heat-transferring medium may also be directed via radial passageways 85 and distribution ring 87 to the rotational bearing supports of spur gears 89.

External annular heat transfer from stator 46 may be provided by way of iron sleeve 60. In particular, iron sleeve 60 may include one or more annular grooves 90 in an outer surface of iron sleeve 60 that, together with an inner annular surface of shell 64, form annular fluid passageways. The heat-transferring medium may enter grooves 90 by way of distribution block 70 and a fluid passageway 94. After transferring heat with the external annular surface of stator 46, the medium may be directed inward via one or more inlet jets 96 to spray onto and cool windings 62. It is contemplated that iron sleeve 60 may be omitted, if desired, or retained and grooves 90 alternatively omitted.

INDUSTRIAL APPLICABILITY

The disclosed electric machine finds potential application in any power system where it is desirable to dissipate substantial amounts of heat from an electric machine in a controlled uniform manner. The disclosed electric machine finds particular applicability in vehicle drive systems. However, one skilled in the art will recognize that the disclosed electric machine could be utilized in relation to other drive systems that may or may not be associated with a vehicle. The heat-transferring operation of electric machine 16 will now be described.

Referring to FIG. 1, when power system 10 is in operation, the heat-transferring medium, conditioned (heated or cooled) by heat exchanger 20, may be pumped by source 24 through power source 12 and/or electric machine 16. As the heat-transferring medium courses through power source 12 and/or electric machine 16, heat may be continuously transferred to or from power source 12 and/or electric machine 16. Upon exiting electric machine 16, the flow of the heat-transferring medium from electric machine 16 may be directed to rejoin the flow of the heat-transferring medium exiting power source 12 where both flows may then be routed through heat exchanger 20 to either expel heat or absorb heat during a conditioning process.

As the flow of the heat-transferring medium enters electric generator 16*a* by way of distribution block 70 (referring to FIG. 2), it may first be directed axially through shell 64 to first end cap 66 where the flow may then be redirected radially inward to distribution ring 81, bearing 48, and axial through bore 76 of shaft 42. Upon entering axial through bore 76, the flow may travel from one end of shaft 42 to the other end, and radially outward away from axial through bore 76 via the first, second, third, fourth, and fifth sets of radial passageways 78, 85, 86, 88.

After exiting the first, second, thirds, fourth, and fifth sets of radial passageways 78, 85, 86, 88, the heat-transferring medium may fill interior annular grooves 80, lubricate bearings 48, fill distribution ring 87, spray against windings 62, and lubricate the engagement between shaft 42 and the radially-offset spur gears 89. The heat-transferring medium may then drain to a sump for circulation back to heat exchanger 20 (referring to FIG. 1) via return conduit 28.

In addition to directing the heat-transferring medium through radial passageway 74 to transfer heat with rotor 44 and internal surfaces of stator 46, the heat-transferring medium may be directed to transfer heat with an external annular surface of stator 46. In particular, the heat-transferring medium may be simultaneously directed through annular grooves 90 of sleeve 60 to transfer heat with outer surfaces of windings 62 and protruding portions 58.

Greater cooling efficiency of electric generator 16*a* may be realized because the heat-transferring medium is directed evenly to components within electric generator 16*a* that tend to generate the greatest amount of heat. Specifically, because the heat-transferring medium is directed along the entire length of shaft 42, along both ends of rotor 44, and to stator 46, a greater amount of heat may be transferred than if the fluid only contacted a single end of rotor 44 and never removed heat from stator 46. Further, because the heat-transferring medium transfers heat evenly with electric generator 16*a*, the heat-induced stresses experienced by the components of electric generator 16*a* may be reduced, as compared to disproportionate heat transfer.

Additional advantages may be realized because the fluid passageways of electric generator 16*a* direct the heat-transferring medium both within and around stator 46. In particular, transferring heat with both inner and outer surfaces of stator 46 may increase the transfer capacity of electric generator 16*a* as compared to only transferring heat with one of the inner or outer surfaces of stator 46.

It will be apparent to those skilled in the art that various modifications and variations can be made to the electric machine of the present disclosure. Other embodiments of the electric machine will be apparent to those skilled in the art from consideration of the specification and practice of the electric machine disclosed herein. It is intended that the specification and examples be considered as exemplary only, with a true scope of the disclosure being indicated by the following claims and their equivalents.

What is claimed is:

1. An electric machine, comprising:

a housing having a first end cap with a first fluid passageway, and a second end cap with a second fluid passageway;

a stator fixedly disposed within the housing; and a rotor rotationally disposed radially inward from the stator and having an axial passageway fluidly communicating the first fluid passageway with the second fluid passageway, the rotor further including an end ring having an interior annular groove, and at least one radial passageway configured to communicate fluid from the axial passageway with end windings of the stator via the interior annular groove.

2. The electric machine of claim 1, wherein the at least one radial passageway is a first radial passageway and the electric machine further includes a second radial passageway separated an axial distance away from the first radial passageway, the second radial passageway also configured to communicate fluid from the axial passageway with end windings of the stator.

3. The electric machine of claim 2, further including:

at least one bearing disposed within the housing and configured to support rotation of the rotor; and a third radial passageway configured to communicate fluid from the axial passageway with the at least one bearing.

4. The electric machine of claim 3, further including:

at least one gear operatively connected to the rotor; and a fourth radial passageway configured to communicate fluid from the axial passageway with teeth of the at least one gear.

5. The electric machine of claim 1, further including:

a cooling sleeve disposed around the stator; and a distribution block configured to distribute cooling fluid to the cooling sleeve, the first fluid passageway, and the second fluid passageway.

6. The electric machine of claim 5, wherein the cooling sleeve is in fluid communication with end windings of the stator.

7. The electric machine of claim 1, further including a bearing disposed with the first end cap and having a first face and a second face, wherein the first end cap includes an axial passageway communicating the first fluid passageway with the first face, and the second face is in fluid communication with end windings of the stator.

8. The electric machine of claim 1, further including an annular distribution ring connected to the first end cap and in fluid communication with the first fluid passageway and an end ring of the rotor.

9. An electric machine, comprising:

a housing having a first bearing, and a second bearing axially spaced apart from the first bearing;

a stator fixedly disposed within the housing; and a rotor rotationally supported by the first and second bearings radially inward from the stator and having an axial passageway fluidly communicating the first and second bearings, the rotor further including an end ring having an interior annular groove, and at least one radial passageway configured to communicate fluid from the axial passageway with end windings of the stator via the interior annular groove.

10. A method of operating an electric machine, comprising:

rotating a rotor disposed radially inward of a stator to generate an electrical output, the rotor comprising an end ring having an interior annular groove;

directing fluid into the electric machine through a housing external to the stator;

directing fluid from the housing axially from one end of the rotor through to the other end of the rotor; and directing fluid from the rotor radially outward through the annular groove to windings of the stator.

11. The method of claim 10, further including directing fluid from the housing directly to the end ring.

12. The method of claim 10, further including directing fluid radially outward from the rotor to a bearing configured to rotationally support the rotor.

13. The method of claim 12, further including directing fluid from the housing directly to a second bearing configured to rotationally support the rotor.

14. The method of claim 10, further including directing fluid radially outward from the rotor to teeth of at least one gear operatively connected to the rotor.

15. The method of claim 10, further including directing fluid from the housing through a cooling sleeve to the windings.

16. A power system, comprising:

a power source operable to generate a rotational mechanical output;

a cooling system operable to cool the power source; and an electric machine operable to receive the rotational mechanical output, to generate a corresponding electrical output, and to receive cooling fluid from the cooling system, the electric machine including:

a housing having a first end cap and a second end cap;

a stator fixedly disposed within the housing;

a first bearing disposed within the first end cap;

a second bearing disposed within the second end cap; and a rotor rotationally supported by the first and second bearings inward from the stator and having an axial passageway fluidly communicating the first and second bearings, the rotor including an end ring having an interior annular groove, and a first radial passageway configured to communicate fluid from the axial passageway with end windings of the stator via the interior annular groove.

17. The power system of claim 16, wherein the rotor includes:

a second radial passageway separated an axial distance away from the first radial passageway, the second radial passageway also configured to communicate fluid from the axial passageway with end windings of the stator;

a third radial passageway configured to communicate fluid from the axial passageway with at least one of the first and second bearings;

at least one gear operatively connected to the rotor; and a fourth radial passageway configured to communicate fluid from the axial passageway with teeth of the at least one gear.

18. The power system of claim 16, further including:

a cooling sleeve disposed around the stator; and a distribution block configured to distribute cooling fluid to the cooling sleeve and to the at least one fluid passageway of the housing, wherein the cooling sleeve is in fluid communication with end windings of the stator.

* * * * *